United States Patent [19]

Falbo et al.

[11] Patent Number: 5,056,828

[45] Date of Patent: Oct. 15, 1991

[54] MODULAR, MULTI-PASSAGE ROTARY COUPLING FOR TRANSFERRING FLUIDS

[75] Inventors: Dario Falbo; Emanuele Garbuglia, both of Venice; Felice Da Prat, Pordenone; Riccardo Belleli, Mantova, all of Italy

[73] Assignees: Comitato Nazionale per la Ricerca e per lo Sviluppo dell'Energia Nucleare e delle Energie Alternative, Rome; Tecnomare S.p.A., Venice; Belleli S.p.A., Montavo, all of Italy

[21] Appl. No.: 497,357

[22] Filed: Mar. 22, 1990

[30] Foreign Application Priority Data

Mar. 31, 1989 [IT] Italy .................. 19971 A/89

[51] Int. Cl.[5] .............................. F16L 55/10
[52] U.S. Cl. ........................ 285/12; 285/24; 285/136
[58] Field of Search .......... 285/136, 134, 190, 330, 285/24, 27, 12

[56] References Cited

U.S. PATENT DOCUMENTS

| | | | |
|---|---|---|---|
| 3,829,134 | 8/1974 | Hutchison | 285/901 X |
| 4,194,767 | 3/1980 | McCracken | 285/190 X |
| 4,405,162 | 9/1983 | Williams | 285/136 X |
| 4,577,892 | 3/1986 | Wrülich et al. | 285/136 |
| 4,647,077 | 3/1987 | Ethridge et al. | 285/136 X |
| 4,669,758 | 6/1987 | Feller et al. | 285/136 X |

FOREIGN PATENT DOCUMENTS 2559302 7/1976 Fed. Rep. of Germany ...... 285/136

Primary Examiner—Dave W. Arola
Assistant Examiner—Heather Chun
Attorney, Agent, or Firm—Morgan & Finnegan

[57] ABSTRACT

A modular multi-passage rotary coupling for transferring fluids in which pipes are rigidly connected with the inner fixed rings of the relevant modules by sleeves. The sleeves, after being coaxially butt-fastened at their bottom end with the pipes, enter proper bores specifically provided in the relevant fixed rings, inside which each of them is fastened under pressure by means of a closure and tight-sealing screw-threaded cap which is screwed down on a corresponding inner threading provided at the upper end of the relevant sleeve and urging, with the crown of its head, against the upper edge of the bore and also by a shoulder step jutting out at the bottom end of the sleeve and cooperating with the lower edge of the bore of the fixed ring.

2 Claims, 3 Drawing Sheets

MODULAR, MULTI-PASSAGE ROTARY COUPLING FOR TRANSFERRING FLUIDS

The present invention relates to a novel modular, multi-passage, rotary coupling for transferring fluids. This coupling makes possible the connection of pipes by means of a disengageable connection, and also allows pipes with bends to be used. Additionally, the overall dimensions in the radial direction, and consequently the diameter of the necessary dynamic seals, can be considerably reduced and the reliability and the useful life of the same coupling being consequently increased.

BACKGROUND OF THE INVENTION

It is well-know that the rotary coupling for transferring fluids is a special component which, when used, e.g., in an off-shore facility, makes it possible for pressurized fluid to flow from a non-rotary structure comprising the system of single-point mooring such as, a single mooring, to a vessel moored to the same structure. The moored vessel is free to rotate around the single mooring on the horizontal plane, in order to arrange itself in a position of minimum resistance to waves, streams and wind.

Several types of rotary couplings for transferring fluids are already known in the prior art.

At first, single-way rotary couplings were developed. Later, the adoption of the single moorings for tankers, as floating systems for hydrocarbon production, caused the need for having available multi-passage rotary couplings. On the other hand, the need to operate with fluids displaying different compositional characteristics, and the different conditions of temperature and pressure they are at, led the designers to develop multi-passage rotary couplings with modular structure, i.e., rotary couplings comprising a plurality of modules assembled along a common vertical axis. In such a way, each module can be designed independently from the other modules, based upon the function of pressure and temperature, or based on the composition of the fluid which is expected to flow through the module.

The prior art modular, multi-passage, rotary couplings are comprised of a plurality of mutually superimposed modular elements, i.e., couplings, wherein each of said modules is suitable for transferring a fluid, substantially comprise, for each module, an inner fixed ring and an outer rotary ring connected with each other and kept mutually concentric by at least one bearing. Said inner fixed ring and said outer rotary ring have bound between each other a toroidal chamber sealed by circular dynamic seals. This chamber puts the ducts for fluid passage provided in said rings into communication with one another, thus enabling the fluid to flow through the module also when said rings are rotated relative to each other. A pipe is then connected with each fixed ring of the modular multi-passage coupling, generally fastened to it by means of flanges, screw-threadings, and so on. This pipe also runs through the fixed rings of the underlying modules. Each fixed ring being further provided with an inner free region, so as to allow all of the fixed pipes—and namely, its own pipe, and the pipes relevant to the overhanging modules—to run through the same module.

To date, all of the modules of a multi-passage, rotary coupling are generally at the same diameter. But, clearly inasmuch as the various fixed pipes are each connected with the fixed ring of the relevant module—with the number of the pipes which run through the subsequent modules obviously decreasing—, said subsequent modules can be given a progressively decreasing diameter with consequent advantageous effects on the dynamic seals. The performance of the dynamic seals, as known, increased with decreasing diameters, besides increasing, of course, with decreasing values of pressure and temperature of the fluid they are designed to contain.

Actually, in particular for fluids which are under high temperature and high pressure conditions, it is preferable to design the modular multi-passage rotary coupling with a tapered configuration, i.e., with modules of progressively decreasing diameter. In such couplings, the fixed pipes which run through the interior of each fixed ring must be given a proper bend in order to be able to match the reduced inner free region of the fixed rings of the successive modules of the coupling.

Unfortunately, such known embodiments have some drawbacks. The most serious of these drawbacks derives from the types of disengageable connection adopted heretofore in order to fasten the fixed pipes to the fixed rings and is given by the large overall dimensions in the radial direction of the modules of the coupling, as determined by the need for providing a large surface area for the free region inside the interior of the fixed rings, or due to the possible presence of a flange of the pipe to be connected with the fixed ring, or in order to be able to possibly screw down a bent fixed pipe onto the fixed ring.

Such a drawback requires using large-diameter dynamic seals, with a consequent considerable reduction in the reliability and reduction in the useful life of the same coupling.

Another drawback shown by the prior art rotary couplings which is caused by the large radial overall dimensions is given by the fact that dynamic mechanical seals show a considerably higher wear resistance than the dynamic seals which are made of polytetrafluoroethylene or other plastic materials, as presently used in the rotary couplings used for transferring fluids in general, in particular, if the fluid contains abrasive substances. Mechanical seals, therefore, endow the same coupling with characteristics of long useful life, requiring an extremely reduced servicing.

Further drawbacks shown by prior art modular multi-passage rotary couplings are then due to 1) the difficult access for interventions from the upper side of the coupling, for example for maintenance reasons, in that the lines are not easily accessed from the top side; 2) to the difficulty of applying easily replaceable devices in order to compensate for the erosion effect of the abrasive particles suspended in the fluid, as well as to difficult replacement of a modular element under failure conditions of the coupling with another space modular element, in order to be able to continue to use the rotary coupling; and 3) with the repair operations, which require the shutdown of the facility, having to be delayed until the most favorable time.

The object of the present invention is of obviating the above said drawbacks and, therefore, of providing a modular multi-passage rotary coupling for transferring fluids, which has greatly reduced overall dimensions in the radial direction, with the consequent possibility of the use of dynamic seals of mechanical type. Another object is to make it easy to access the lines from the top side and to make it easy to apply replaceable devices in order to protect the coupling against the failures caused by abrasion. A still further object is to make possible an immediate by-pass connection to be produced from a module under failure conditions to a spare module.

SUMMARY OF THE INVENTION

The above objectives are substantially achieved by rigidly connecting each fixed pipe with the fixed ring of the relevant module of the rotary coupling by means of a sleeve which, after being coaxially butt-fastened at its bottom end with said pipe, is fastened under pressure inside a corresponding bore provided in the fixed ring by means of a closure and tight-sealing screw-threaded cap which is screwed down on a corresponding inner threading provided at the upper end of the sleeve and which urges with the crown of its head against the upper edge of the bore, as well as by means of a shoulder step jutting out at the bottom end of the sleeve and cooperating with the lower edge of said bore of the fixed ring. On the other hand, a key is used which acts between the sleeve and the inner fixed ring in order to secure, at any time, the mutual alignment of the duct provided in the fixed ring and the bore provided in the sleeve so as to make possible for the fluid to flow from the fixed pipe into said toroidal chamber and vice-versa.

In the improved modular multi-passage and rotary coupling of the present invention, it becomes possible for the toroidal chamber to be considerably closer to the fixed pipe with the diameter of the necessary dynamic seals being thus reduced. The disassemblable connection of the pipe with the fixed ring is now attained without screwing down the pipe on the same ring, or without having to resort to a flange-bolts connection system which cause large overall dimensions in the radial direction. Furthermore, the access to the lines—by means of the simple removal of said closure and tight-sealing screw-threaded caps—becomes easier and more convenient.

The instant modular multi-passage rotary coupling for transferring fluids comprises a plurality of modules wherein the modules have different diameters and are coaxially superimposed to each other and fastened to each other. Each of said modules comprises an inner fixed ring and an outer rotary ring connected with each other and kept mutually concentric by at least one bearing. The inner fixed ring and said outer rotary ring bound between each other a toroidal chamber which is sealed by circular dynamic seals. The chamber puts the ducts for fluid passage respectively provided in said rings into communication with each other. Each fixed ring of said modules having a pipe rigidly connected thereto, which pipe runs through the inner fixed rings of the underlying modules inside an inner free region provided in each inner fixed ring. Each one of s id fixed pipes is rigidly connected with the inner fixed ring of the relevant module of the rotary coupling by means of a sleeve which, after being coaxially butt-fastened at its bottom end with said pipe, is fastened under pressure inside a corresponding bore provided in the fixed ring by means of a closure and tight-sealing screw-threaded cap which is screwed down on a corresponding inner threading provided at the upper end of the sleeve and urges with the crown of its head against the upper edge of the bore, as well as by means of a shoulder step jutting out at the bottom end of the sleeve and cooperating with the lower edge of said bore provided in the fixed ring. An alignment key being provided between said sleeve and said inner fixed ring.

According to a preferred embodiment of the present invention, said sleeve used to connect a pipe with the inner fixed ring of the relevant module is also provided at its bottom end with an inner threading suitable to make it possible to fasten the extension pipe by screwing-down. The extension pipe is used to connect said pipe with the inner fixed ring of an overhanging spare module by means of said closure and tight-sealing screw-threaded cap. In such a way, an immediate by-pass connection is produced from a module under failure conditions to a spare module without having to discontinue the operation of the other modules of the coupling by simply removing the closure and tight-sealing cap.

BRIEF DESCRIPTION OF THE DRAWINGS

An embodiment of the present invention is described by reference to the hereto attached drawings. These drawings illustrate a preferred form of the present invention and are given for merely exemplifying, non-limitative purposes, in that technical and/or structural variants may always be made without departing from the scope of the present invention.

In said drawings.

DETAILED DESCRIPTION OF THE DRAWINGS

Figure 1:
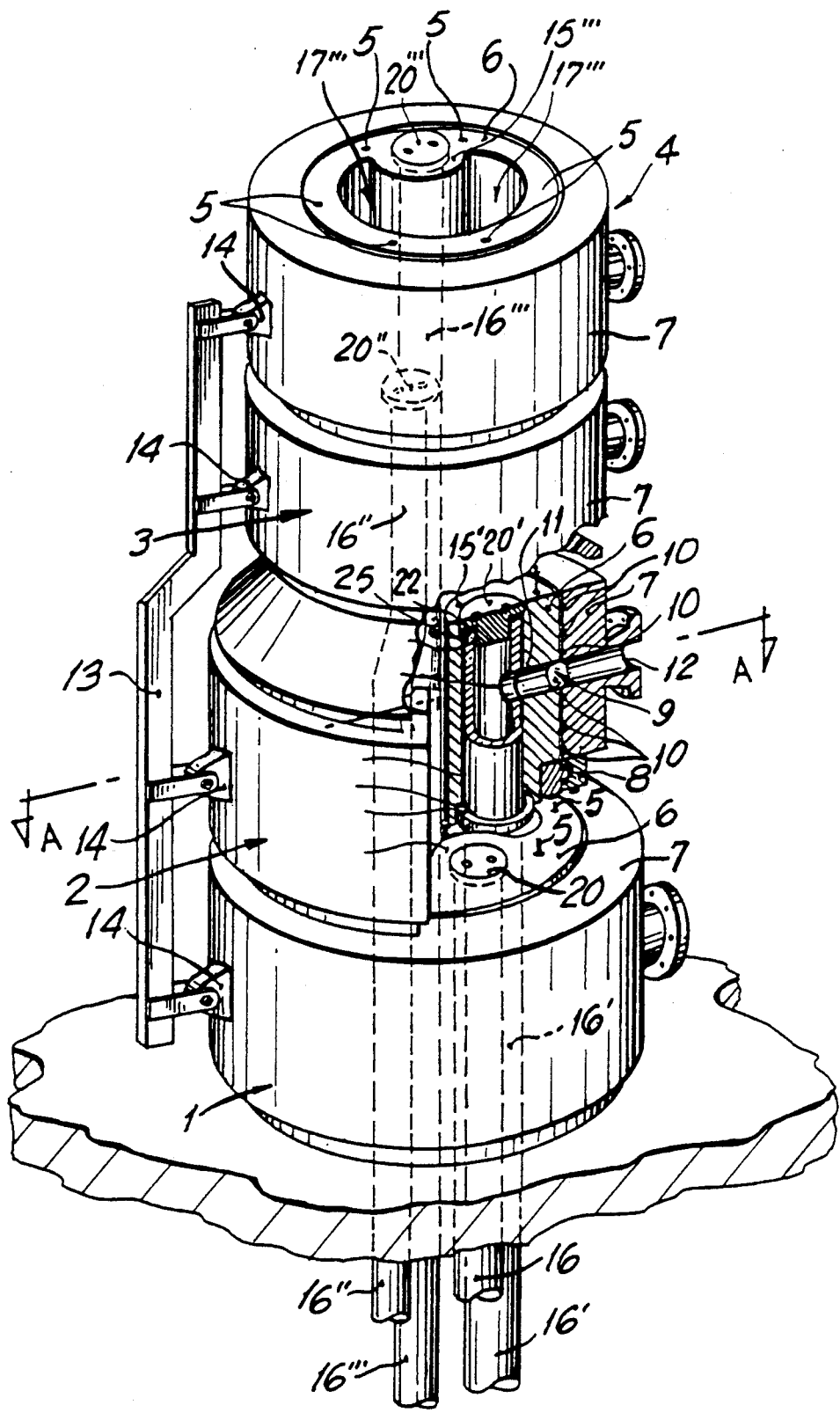
FIG. 1 shows a perspective, partially sectional view of a modular four-passage rotary coupling for transferring fluids according to the present invention.
Figure 2:
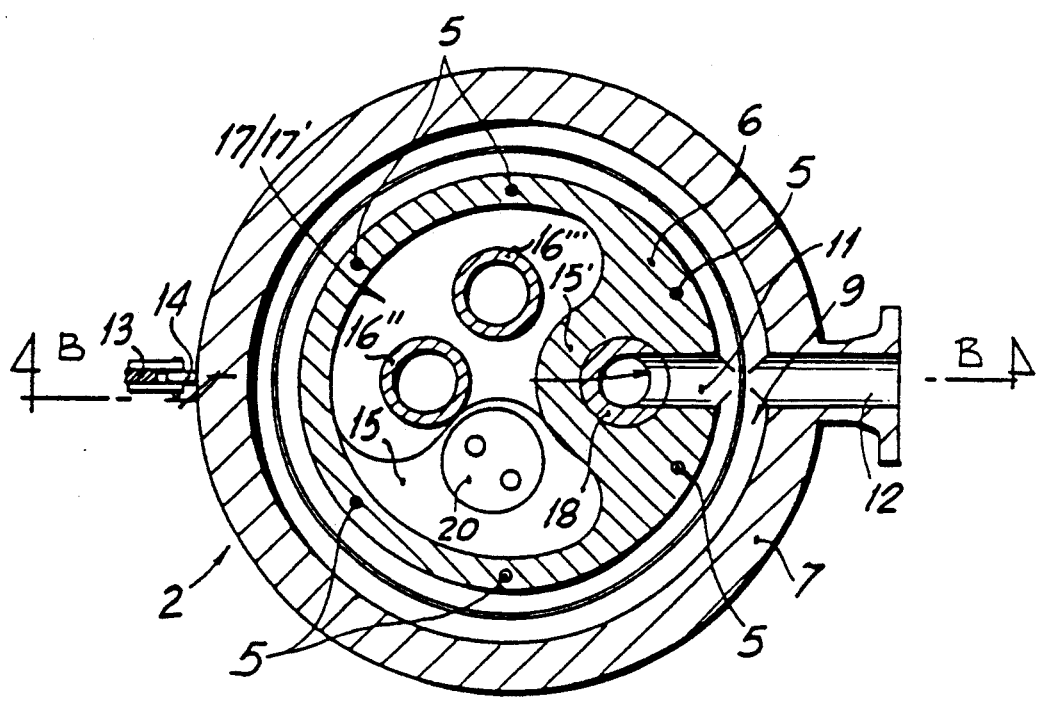
FIG. 2 shows a sectional top view made along line AA of FIG. 1.
Figure 3:
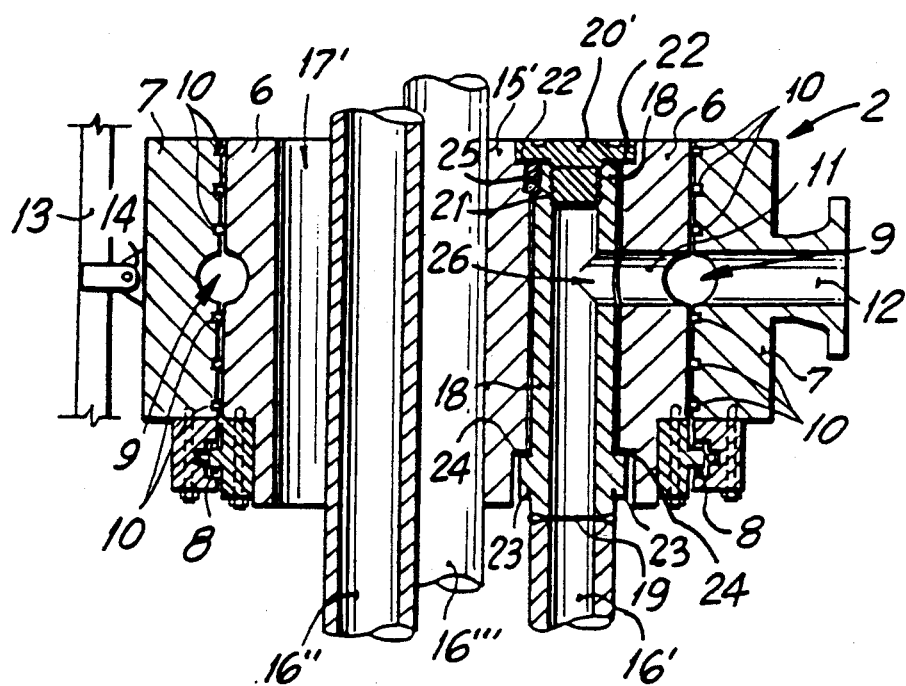
FIG. 3 shows a vertical sectional view of a module of the coupling made through line BB of FIG. 2.

Referring to the figures, modules of different diameters are indicated with the reference numerals 1, 2, 3 and 4. The module are co-axially superimposed with each other and are fastened to one another by means of the tie-rods 5. Said modules constitute the modular four-passage rotary coupling for transferring fluids, according to the present invention.

Each module comprises an inner fixed ring 6 and an outer rotary ring 7, which are connected with, and kept concentric to each other, by a bearing 8, and also bound between each other a toroidal chamber 9 which is sealed by the dynamic circular seals 10. Said toroidal chamber 9 puts the duct 11 for fluid passage provided in the fixed ring 6 into communication with the duct 12 for fluid passage provided in the rotary ring 7. The rotary rings 7 of the modules 1, 2, 3 and 4 are then connected with one another by means of a dragging bar 13 which is hinged to brackets 14 provided in said rotary rings, so that the modules are forced to rotate simultaneously.

Each inner fixed ring 6 is also provided with an enlarged portion, respectively 15, 15', 15" and 15''' (reference is specifically made to FIG. 1, in which the enlarged portion 15" is not shown), and bore is provided inside the enlarged portion, inside which a pipe—respectively indicated by the reference numeral 16, 16', 16" and 16'''—is rigidly connected with the inner fixed ring. Said pipes run through the inner fixed rings 6 of the underlying modules inside an inner free region, respectively indicated with the reference numeral 17, 17', 17" and 17'" provided in each inner fixed ring 6.

The above said rigid connection of the pipe inside the bore of the respective inner fixed ring is achieved by means of a sleeve 18 which, after being butt-fastened at its bottom with said pipe, and coaxially with it by means of the weld 19, is pressure-fastened inside said bore by means of a closure and tight-sealing threaded cap, respectively 20, 20', 20" and 20'", which is screwed down on a corresponding inner threading 21 provided at the upper end of the sleeve 18 and urges with the crown of its head 22 against the upper edge of said bore, while a shoulder step 23 jutting out at the bottom end of the sleeve 1B cooperates with the bottom edge 24 of said bore.

An alignment key 25 is then inserted inside a suitable keyhole a part of which is provided in said sleeve 18 and a part of which is provided in said inner fixed ring 6 in order to secure the mutual alignment of the bore 26 for fluid passage provided in the sleeve 18 and said duct 11 for fluid passage provided in the inner fixed ring 6.

Figure 4:
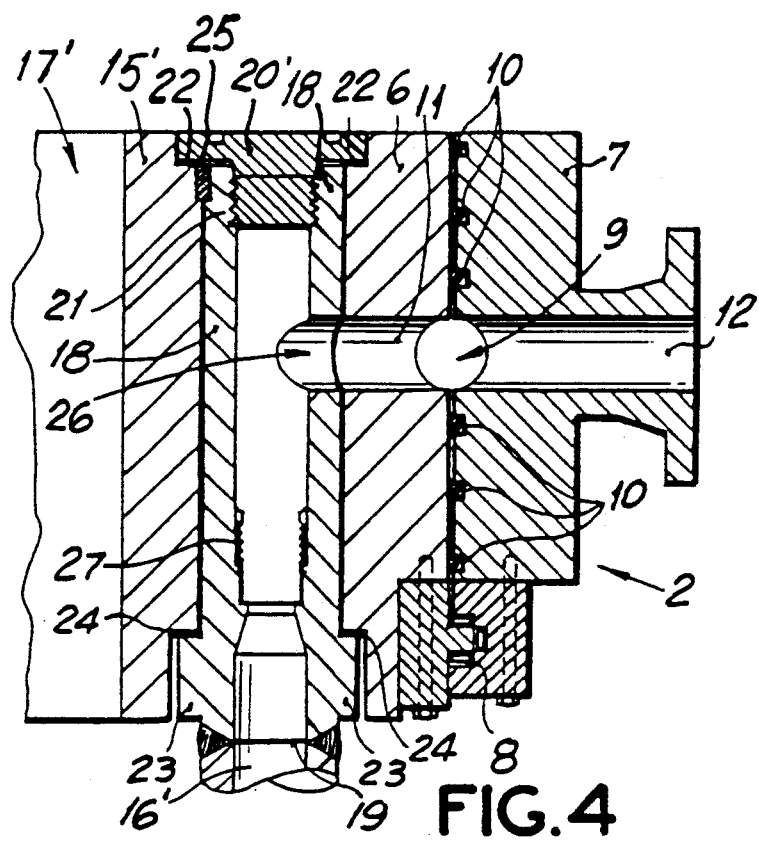
FIG. 4 shows a partial, vertical sectional view, similar to the view of FIG. 3, of a variant according to the invention.
Figure 5:
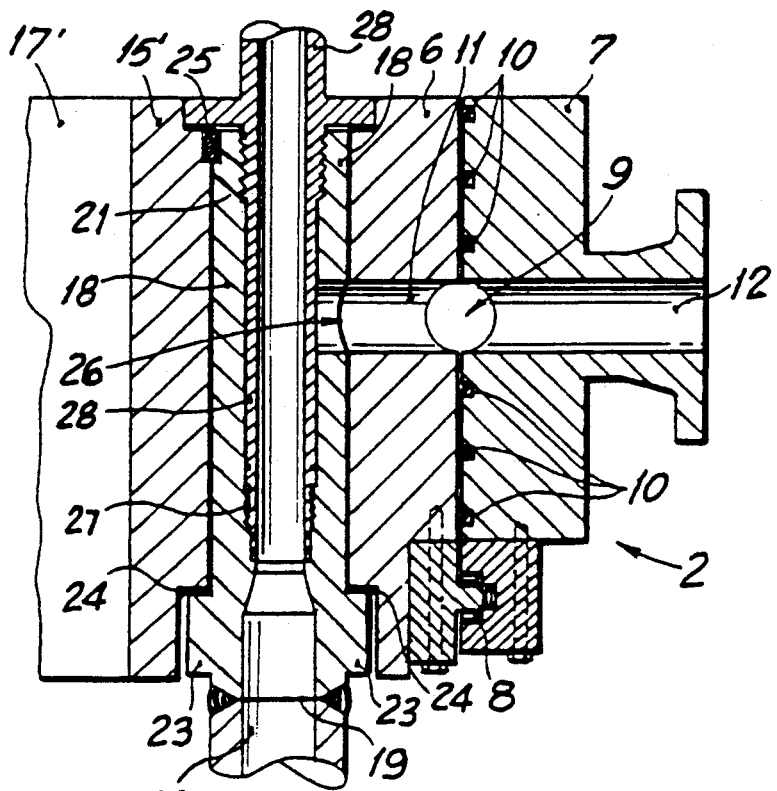
FIG. 5 shows a view similar to the view of FIG. 4 and the by-pass connection accomplished according to the present invention.

Finally, according to a preferred form of the invention (see FIGS. 4 and 5), said sleeve 18 is additionally provided, at its bottom end, with a further inner threading 27 on which a suitable inner extension pipe 28 can be threaded, which extension pipe, makes possible for the incoming pipe to be directly connected with an overhanging spare module and makes possible for said module 2 to be by-passed in case of failure.

We claim:

1. A modular multi-passage rotary coupling for transferring fluids, comprising a plurality of modules, said modules having different diameters and being coaxially superimposed to each other and fastened to one another, each of said modules comprising an inner fixed ring and an outer rotary ring connected with each other and kept mutually concentric by at least one bearing, the inner fixed ring and said outer rotary ring having formed between each other a toroidal chamber which is sealed by circular dynamic seals, each said ring having a duct therein communicating with said chamber for fluid passage therethrough, each fixed ring of said modules being rigidly connected to a pipe, said pipe passing through the inner fixed rings of underlying modules inside an inner free region provided in each inner fixed ring, each of said fixed pipes being rigidly connected with the inner fixed rings of the respective modules of the rotary coupling by means of a sleeve positioned in a bore in said inner fixed ring, said sleeve having a bore therethrough, and an opening through a wall in said sleeve for communication with said bore, and being coaxially fastened at its bottom end with said pipe and being fastened inside said bore provided in the fixed ring by means of a closure formed by a tightsealing screw-threaded cap which is screwed down on a corresponding inner threading provided at an upper end of the sleeve and said cap is provided with a crown which bears against an upper edge of the bore of said inner fixed ring, said sleeve having a shoulder step means at said bottom end jutting out and cooperating with a lower edge of said bore provided in the fixed ring, and an alignment key which is provided between said sleeve and said inner fixed ring for alignment of said opening with said duct in said inner ring.

2. A modular mini-passage rotary coupling according to claim 1, wherein at least one of said sleeves used to connect the pipes with the inner fixed ring of the modules is provided at its bottom end with an inner threading in said bore, said threading being adapted after removing said cap to make possible for an extension pipe to be threadedly fastened thereto, said extension pipe being further adapted to close said opening in said sleeve and to connect the fluid passing in said pipe and said sleeve with an inner fixed ring of an overhanging spare module.

* * * * *